(12) United States Patent
Dubois et al.

(10) Patent No.: US 12,141,668 B2
(45) Date of Patent: Nov. 12, 2024

(54) DECENTRALIZED CONTROL OF BEAM GENERATING DEVICES

(71) Applicant: Raytheon Company, Tewksbury, MA (US)

(72) Inventors: Michael D. Dubois, Franklin, MA (US); Darrell L. Young, Falls Church, VA (US); Stephen K. Freitag, Marlborough, MA (US)

(73) Assignee: Raytheon Company, Tewksbury, MA (US)

( * ) Notice: Subject to any disclaimer, the term of this patent is extended or adjusted under 35 U.S.C. 154(b) by 193 days.

(21) Appl. No.: 17/655,967

(22) Filed: Mar. 22, 2022

(65) Prior Publication Data

US 2022/0309398 A1   Sep. 29, 2022

Related U.S. Application Data

(60) Provisional application No. 63/164,990, filed on Mar. 23, 2021.

(51) Int. Cl.
| | |
|---|---|
| *G06N 20/00* | (2019.01) |
| *G06N 3/08* | (2023.01) |
| *H04B 7/06* | (2006.01) |
| *H04B 7/08* | (2006.01) |

(52) U.S. Cl.
CPC .............. *G06N 20/00* (2019.01); *G06N 3/08* (2013.01); *H04B 7/0695* (2013.01); *H04B 7/088* (2013.01)

(58) Field of Classification Search
CPC ........ G06N 20/00; G06N 3/08; H04B 7/0695; H04B 7/088
See application file for complete search history.

(56) References Cited

U.S. PATENT DOCUMENTS

| | | | |
|---|---|---|---|
| 4,347,513 | A | 8/1982 | Schindler |
| 7,151,483 | B2 | 12/2006 | Dizaji et al. |
| 9,250,317 | B1 | 2/2016 | Wang et al. |
| 11,984,964 | B2 | 5/2024 | Shumadine et al. |
| 2013/0123981 | A1 | 5/2013 | Lee et al. |
| 2018/0007055 | A1 | 1/2018 | Infante-lopez et al. |
| 2019/0130251 | A1* | 5/2019 | Lao ................... G06F 16/90332 |
| 2019/0204834 | A1* | 7/2019 | Harrison ................ G06N 3/045 |

(Continued)

FOREIGN PATENT DOCUMENTS

| | | |
|---|---|---|
| CN | 103018722 | 7/2014 |
| CN | 104318115 | 1/2015 |

(Continued)

OTHER PUBLICATIONS

U.S. Appl. No. 17/740,692, filed May 10, 2022, Decentralized Control via Adaptive Importance Encoding.

(Continued)

*Primary Examiner* — Derrick V Rose
(74) *Attorney, Agent, or Firm* — Schwegman Lundberg & Woessner, P.A.

(57) ABSTRACT

Discussed herein are devices, systems, and methods for beam generating device management. A method can include producing a directed electromagnetic beam, receiving a first message from a second beam generating device, and implementing a first machine learning (ML) model that operates on the received first message to determine a next objective to be completed by the beam generating circuitry.

17 Claims, 8 Drawing Sheets

(56) References Cited

U.S. PATENT DOCUMENTS

| | | | |
|---|---|---|---|
| 2019/0207672 A1* | 7/2019 | Arora | H04B 7/18584 |
| 2020/0358514 A1 | 11/2020 | Landis et al. | |
| 2021/0166083 A1 | 6/2021 | Zhang et al. | |
| 2022/0308204 A1* | 9/2022 | Zaidi | G01S 13/426 |
| 2022/0360316 A1 | 11/2022 | Shumadine et al. | |

FOREIGN PATENT DOCUMENTS

| | | |
|---|---|---|
| CN | 105353359 | 2/2016 |
| CN | 105607045 | 5/2016 |
| CN | 105259541 | 10/2017 |
| CN | 106707273 | 5/2019 |
| CN | 106211351 | 7/2019 |
| CN | 107219521 | 8/2019 |
| CN | 110161479 | 8/2019 |
| CN | 110187336 | 8/2019 |
| CN | 111273266 | 6/2020 |
| CN | 108983165 | 3/2022 |
| CN | 108594203 | 5/2022 |
| KR | 20200132114 | 11/2020 |
| WO | 2020135919 | 7/2020 |
| WO | 2022204684 | 9/2022 |

OTHER PUBLICATIONS

"International Application Serial No. PCT US2022 071269, International Search Report mailed Jun. 24, 2022", 4 pgs.

"International Application Serial No. PCT US2022 071269, Written Opinion mailed Jun. 24, 2022", 6 pgs.

"U.S. Appl. No. 17/740,692, Non Final Office Action mailed Jun. 23, 2023", 8 pgs.

"U.S. Appl. No. 17/740,692, Response filed Sep. 25, 2023 to Non Final Office Action mailed Jun. 23, 2023", 9 pgs.

"International Application Serial No. PCT US2022 071269, International Preliminary Report on Patentability mailed Oct. 5, 2023", 8 pgs.

"U.S. Appl. No. 17/740,692, Notice of Allowance mailed Jan. 11, 2024", 5 pgs.

* cited by examiner

DECENTRALIZED CONTROL OF BEAM GENERATING DEVICES

CLAIM OF PRIORITY

This application claims priority to U.S. Provisional Application No. 63/164,990, filed, Mar. 23, 2021, which is hereby incorporated by reference herein in its entirety.

TECHNICAL FIELD

Embodiments discussed herein regard devices, systems, and methods for cooperative management of beam generating device objectives.

BACKGROUND

Current beam generating devices operate based on heuristics. The heuristics dictate a next objective to be fulfilled by the beam generating devices. Some beam generating devices are pre-programmed to perform operations that are repeated. Both of these solutions to beam generating device operation are inefficient and can waste time and beam generating device operation.

DETAILED DESCRIPTION

Beam generating devices that work together to satisfy one or more objectives face challenges in how to allocate resources and achieve objectives. Common resources for a beam generating device that are managed include the generated beam(s) and time spent generating the beam. The objective of the beam generating device can include: 1) using the beam(s) to sample an existing target; 2) use the beam to scan for a new target; 3) use the beam to scan weather conditions; 4) use a beam generating device to receive data; 5) use the beam to transmit data; or a combination thereof. Two or more beam generating devices working alone on multiple objectives in a same, adjacent, or overlapping geographical region can waste resources due to duplication of work. It can be inefficient for both beam generating devices to operate on a first objective (and too closely together in time) when one of the beam generating devices could have been working to achieve a second objective and their beam was not necessary for the first objective or a first beam generating device can be better equipped to perform a beam operation because of the relative location of the beam generating device to the target or because of different equipment on the beam generating devices. On the other hand, simultaneous sampling of the target can yield a better completion of the objective, such as an improved estimate (e.g., a three-dimensional (3D) or two-dimensional (2D) estimate) of the location.

Examples of cooperative beam generating devices include radars, communication devices (e.g., phones, access points (e.g., cellular communications towers, local area network (LAN) access points (APs), such as a wireless fidelity (WiFi) AP, or the like), optics devices, or the like. A group of radars, such as a netted radar system is an example of a group of beam generating devices with multiple objectives. A group of cellular towers or LAN APs managing communications to/from phones or other cellular communication devices is another example of a group of beam generating devices. Yet another example of beam generating devices includes a constellation of satellites.

Operators of these groups of beam generating devices have long sought a method that enables the entire system to act as a single coordinated unit. These teachings solve that problem. The solution can include machine learning (ML) content of communications between the beam generating devices. The learning of the ML can be based on an observation by the beam generating device, one or more messages from other beam generating devices in the group, or a combination thereof.

Figure 1:
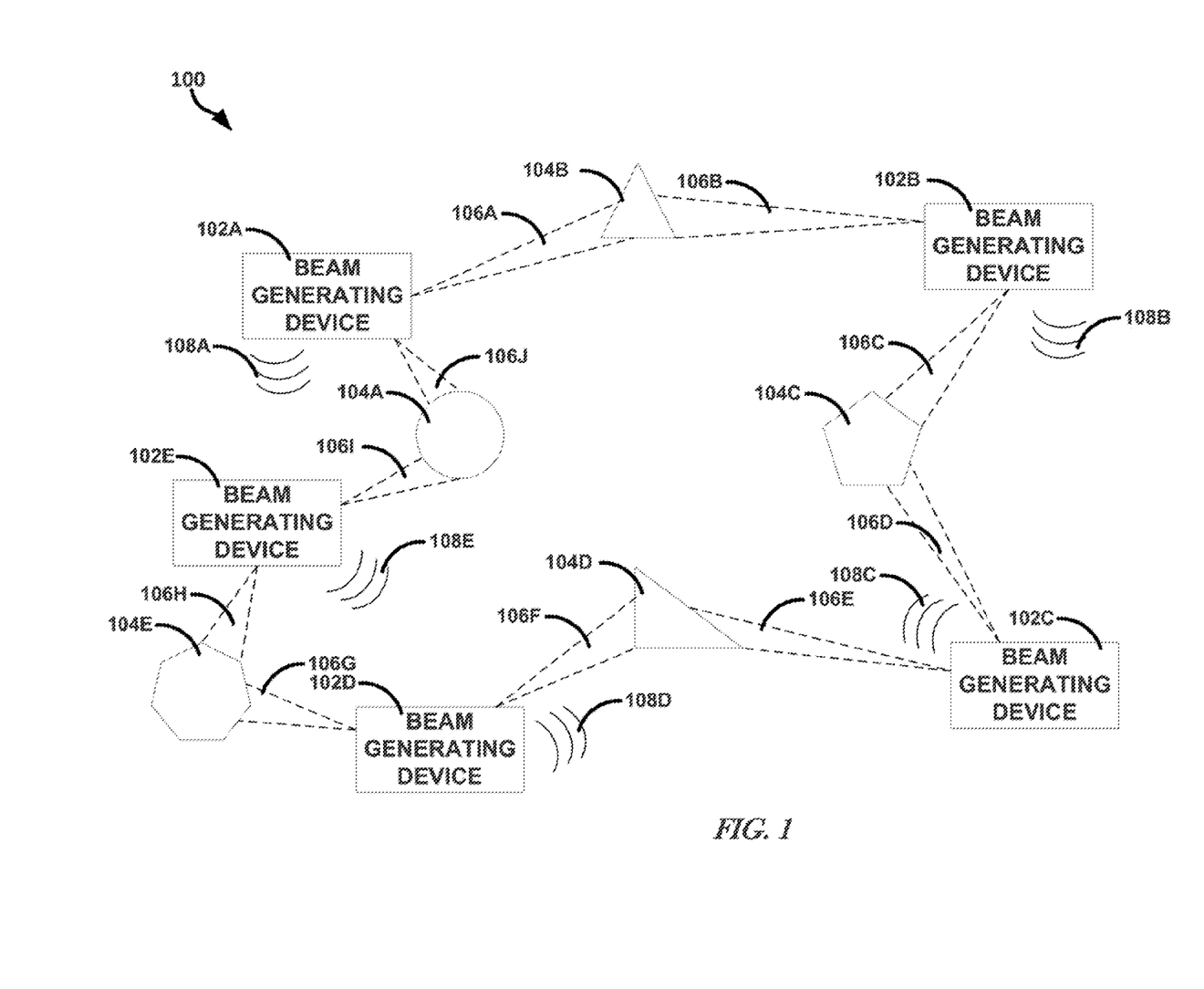
FIG. 1 illustrates, by way of example, a diagram of a system that includes cooperating beam generating devices.

FIG. 1 illustrates, by way of example, a diagram of a system 100 that includes cooperating beam generating devices 102A, 102B, 102C, 102D, and 102E. The beam generating devices 102A-102E are cooperating to satisfy multiple objectives. The objectives are associated with objects 104A, 104B, 104C, 104D, and 104E in FIG. 1. The objectives include the beam generating devices 102A-102E generating a beam 106A, 106B, 106C, 106D, 106E, 106F, 106G, 106H, 106I, 106J in a specific direction. The specific direction can be based on a known or estimated position, velocity, direction, acceleration, or the like, of the object 104A-104E. The specific direction can be based on a scan of a geographical area that is to be scanned and prior scans of the geographical area, externally-provided information about one or more of the objectives (e.g., automatic dependent surveillance-broadcast (ADS-B) is information external to the system that can be utilized in the overall scheduling of the beams, or identifying position of the targets (e.g., objects 104A-104E) based on global positioning system (GPS) and communication from the targets to the beam generating device(s) 102A-102E. A scan means that the beam 106A-106I is directed at the location and information is either transmitted to and/or received from the location.

In the example of FIG. 1, each of the beam generating devices 102A-102E cooperates with the other beam generating devices 102A-102E to satisfy the objectives. In the simple example of FIG. 1, the beam generating devices 102A-102E each choose between scanning different objects or an area, such as to identify a new object. The beam generating device 102A, for example, chooses to scan either the object 104A or the object 104B. The beam generating device 102C, for example, chooses to scan either the object 104C or the object 104C.

The decision by the beam generating device 102A-102E can be based on an observation (a result of a scan performed by the beam generating device 102A-102E), one or more messages received at the beam generating device 102A-102E that are from other beam generating devices 102A-102E, external information, or a combination thereof. The messages from the other beam generating devices 102A-102E, the observation, or a combination thereof can be used as input to one or more ML techniques that determine an action to be performed by the beam generating device 102A-102E or a message to be transmitted by the beam generating device 102A-102E. An action can include a direction in which to scan, when to scan in that direction, waveform properties to use when scanning, or a combination thereof.

Communications 108A, 108B, 108C, 108D, 108E between beam generating devices 102A-102E can be Ethernet, radio, satellite communications, a combination thereof, or the like. The communications 108A-108E can include results of a scan, an action being performed by one or more other beam generating devices 102A-102E, the message generated by an ML model, a combination thereof, or the like.

While five beam generating devices 102A-102E and five objects 104A-104E are illustrated in FIG. 1, more or fewer beam generating devices, objects, or objectives can be included or satisfied using teachings.

Figure 2:
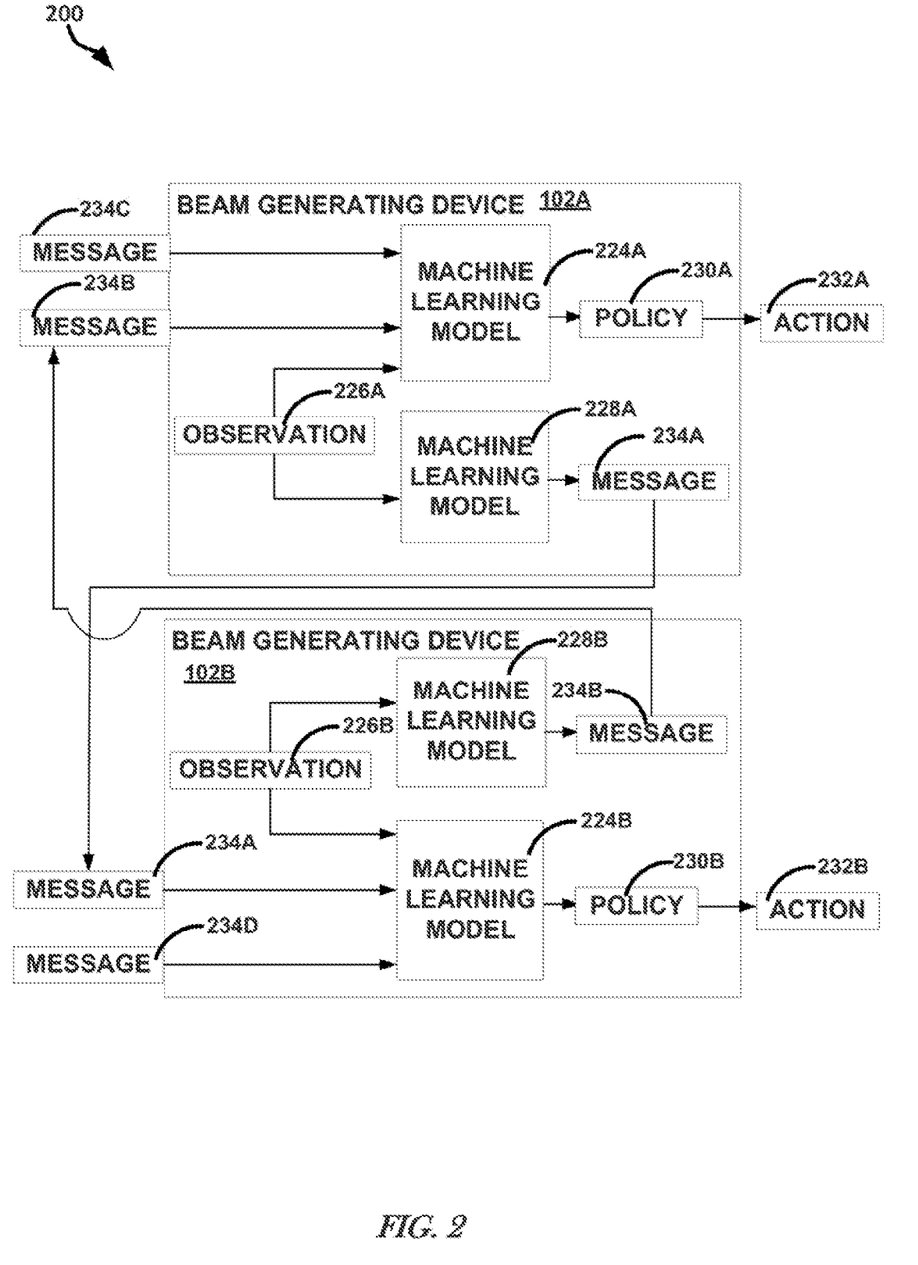
FIG. 2 illustrates, by way of example, a diagram of a system for cooperative fulfillment of objectives by beam generating devices.

FIG. 2 illustrates, by way of example, a diagram of a system 200 for cooperative fulfillment of objectives by beam generating devices 102A, 102B. The system 200 includes a first beam generating device 102A and a second beam generating device 102B. The beam generating devices 102A-102B can work with each other to satisfy multiple objectives.

The beam generating device 102A can communicate a message 234A to the beam generating device 102B. The message 234A can inform the beam generating device 102B regarding a next action 232B to be performed by the beam generating device 102B.

The beam generating devices 102A-102B can include processing circuitry that implements one or more ML models 224A, 224B, 228A, 228B. The processing circuitry can include electric or electronic components, software, firmware, or a combination thereof configured to perform compute operations of the beam generating device 102A-102B. The electric or electronic components can include one or more transistors, resistors, capacitors, diodes, inductors, power supplies, memory devices, processing units (e.g., central processing units (CPUs), field programmable gate arrays (FPGAs), application specific integrated circuits (ASICs), graphics processing unit (GPU), or the like), logic gates (e.g., AND, OR, XOR, negate, buffer, or the like), oscillators, amplifiers, analog to digital converters, digital to analog converters, a combination thereof, or the like.

The ML models 224A, 224B receive one or more messages and one or more observations as input. The messages can be from other beam generating devices 102 within communication range of the beam generating device 102 or within range of a specific object 104. The ML model 224A, for example, can receive a message 234B from the beam generating device 102B as input. The ML model 224A can receive one or more messages 234C from other beam generating devices 102. The ML model 224A can further receive an observation 226A as input. The ML model 224A can operate on the messages 234B, 234C to generate an output. The output can be processed through a policy 230A.

The messages 234A-234D can include information pertinent to determining an action to be performed 232A, 232B. The pertinent information can include the action 232A being performed by the beam generating device 102, an action being performed by another beam generating device 102, the observation 226 from the beam generating device 102, a combination thereof or the like.

The observation 226 is a result from generating a beam, by the beam generating device 102. The observation 226 can include an acknowledge (ACK), negative ACK (NACK), a result of a scan (e.g., a reflected beam, data indicating a target was present or not, a location of the target, a combination thereof, or the like).

The ML model 224A, 224B can be trained to produce an output that corresponds to an action 232A, 232B respectively performed by the beam generating device 102A. The ML model 224A, 224B can be trained to produce an output that minimizes a cost function that considers multiple objectives to be completed by the beam generating devices 102A-102E.

A multi-agent system is a group of autonomous, interacting entities (beam generating devices 102A-102E in the example of FIG. 1) sharing a common environment, which they perceive with transducers (e.g., sensors) and upon which they act with actuators. Multi-agent systems find application in a variety of domains including autonomous teams, distributed control, resource management, collaborative decision support systems, data mining, mission completion, among others Although the agents in a multi-agent system can be programmed with behaviors designed in advance, the agents often benefit from learning new behaviors during runtime, such that the operation of the agent or of the whole multi-agent system improves relative to some metric (a cost function). This is usually because the complexity of the environment makes the a priori design of best agent operations difficult or even impossible. In an environment that changes over time, a hardwired behavior may become inappropriate or even impossible.

A reinforcement learning (RL) agent learns by interacting with its dynamic environment. At each time step, the agent perceives, by the transducer or external information, the state of the environment and takes an action. A reward signal evaluates the quality of each action, and the agent can attempt to maximize the cumulative reward (cost) along the course of interaction. The RL feedback (RL reward) is, more informative than in unsupervised learning, where there is no explicit feedback on the performance, but is less information than in supervised learning, where a proper action is provided as part of training. Well-understood, provably convergent algorithms are available for solving a single-agent RL task.

The ML model 224 can be a multi-agent reinforcement learning (MARL) model. MARL can include training each beam generating device 102 to learn its operating policy 230. After training, the beam generating device 102 can execute, via the processing circuitry the learned policy 230 at every decision waypoint in real time. If the training encompasses sufficient diversity, the policy 230 learns to generalize to make correct decisions on never-before-seen situations.

The policy 230A, 230B can convert output from the ML model 224A, 224B to an action 232A, 232B. The policy 230A, 230B can indicate, for each possible action of the beam generating device 102, the action that maximizes the reward (minimizes the multi-agent cost function).

The cost function can be provided to the beam generating devices 102 before training. The cost function can be defined by an operator or other personnel to meet objectives of the beam generating devices 102. A control interface can enable an operator to change how they want the system to work by adjusting the basis of the cost function and can enable the beam generating devices 102 to be trained over a wide variety of cost functions. For example, a slider bar can be manipulated by the operator to adjust system level performance objectives that define the cost function, such as an ability to track existing aircraft, scan for new aircraft, work together to do high precision cooperative tracking, characterize weather, a combination thereof, or the like. No matter what settings the operator picks, the system can respond because it has been trained in advance for the basis of the cost function. For any given cost function, the training gives the system the memory it needs to find the right policy action to meet the cost function goal based on the observations.

The ML model 228A, 228B can generate the message 234A, 234B. The ML model 228A, 228B can be trained based on observation 226A, 226B. The message 234A, 234B can indicate to the other beam generating devices 102A-102E whether a previous objective was completed by the beam generating device 102A, 102B, respectively. The message 234A, 234B can help inform the ML model 224A, 224B regarding a cost of performing a next action.

Figure 3:
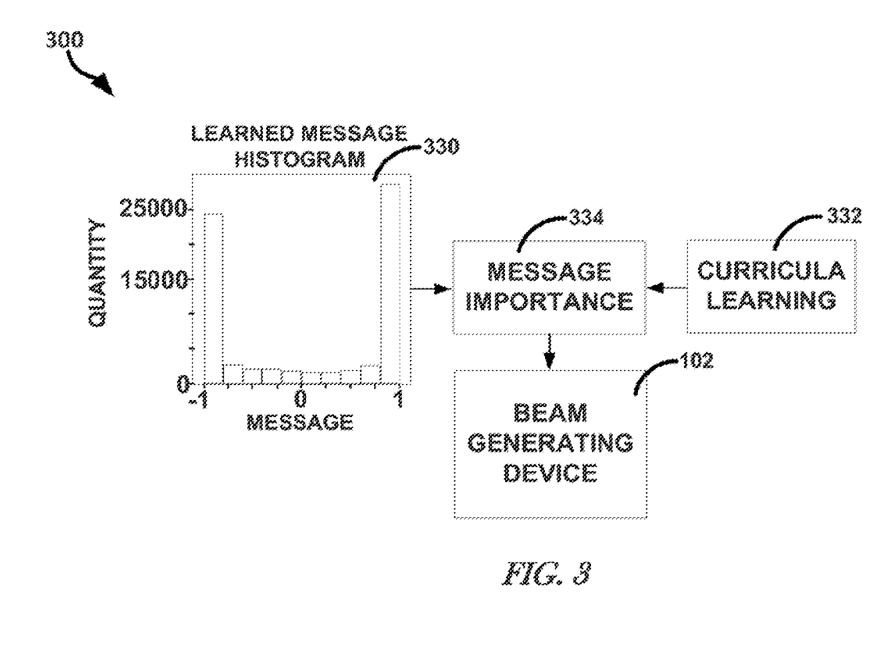
FIG. 3 illustrates, by way of example, a diagram of a system for training a system of beam generating devices.

FIG. 3 illustrates, by way of example, a diagram of a system 300 for training communication between a system of beam generating devices. The system 300 includes messages from beam generating devices 102A-102E, such as by using curricula learning at operation 332. Curricula learning is a type of learning in which one starts out with easier examples of a task and gradually increases its difficulty. In the examples of training communication between beam generating devices, curricula learning can include training communication with fewer beam generating devices and increasing the number of beam generating devices being trained to communicate.

Curriculum learning describes a type of learning in which easy examples of a task are learned and then tested on tasks of gradually increasing task difficulty. In the context of completion of objectives by the beam generating devices 102A-102E, the difficulty can come in the form of an increased number of beam generating devices 102A-102E, objectives, or a combination thereof. Curricula learning, in this instance, can include training fewer beam generating devices 102A-102E to cooperate to achieve the objectives. Then the results of that training are then loaded onto more beam generating devices 102A-102E and more beam generating devices 102A-102E can be trained to satisfy the objectives (or more objectives). Then the results of that training can be used to train more beam generating devices, and so on. If one were to just jump to training all of the beam generating devices 102 right away, the solution may not converge. The iterative training provided by curricula learning provides a way to get a solution that converges for more beam generating devices 102.

In training, the ML model 224A, 224B can be trained to determine an importance of a learned message, at operation 334. The learned message importance can be based on a histogram 330 of the learned messages sent to the beam generating device 102. The importance of the message can be learned to optimize the reward for performing the correct action in working with the other beam generating devices 102 in satisfying the objectives.

Figure 4:
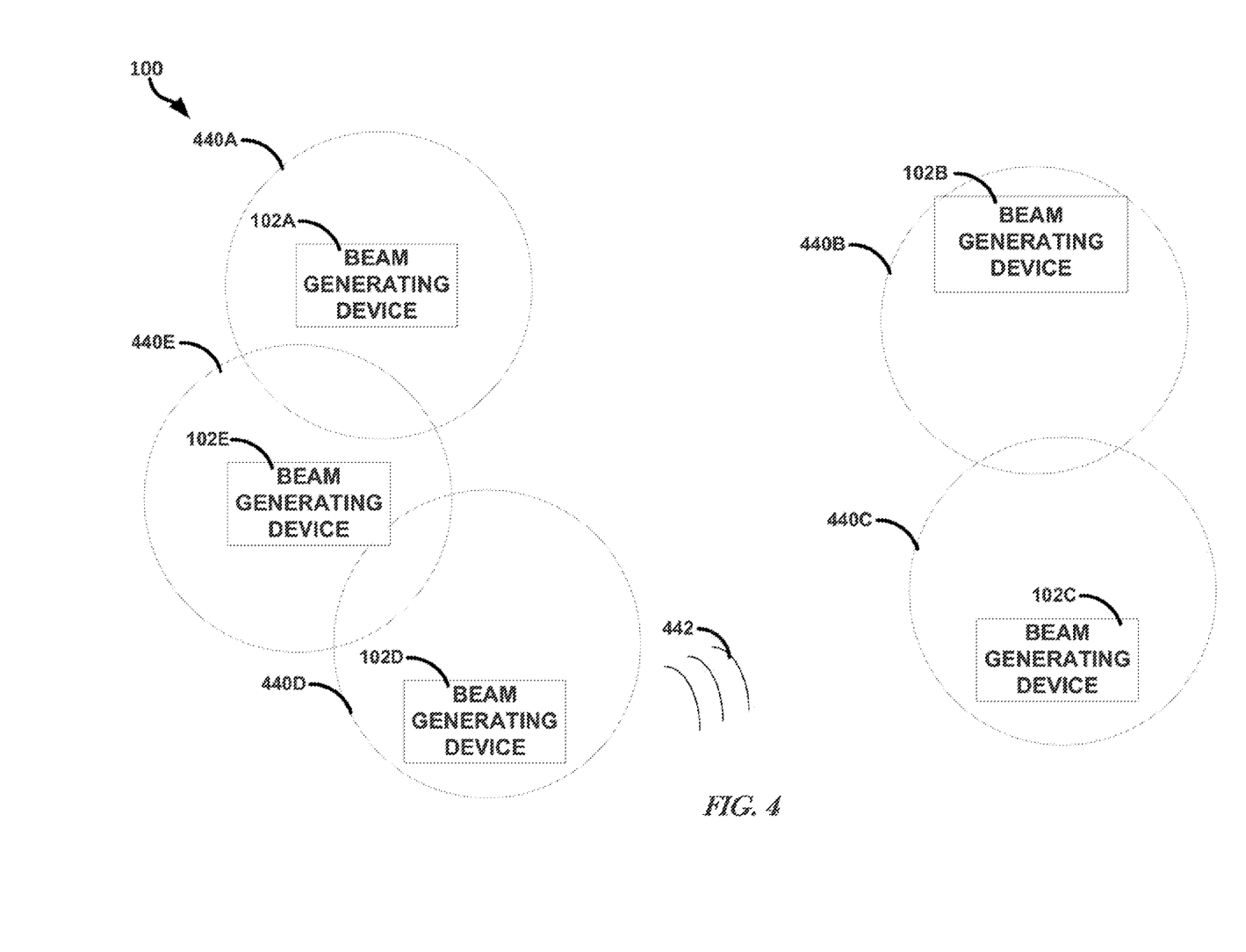
FIG. 4 illustrates, by way of example, a diagram of an embodiment of the system that helps explain beam generating device communication.

FIG. 4 illustrates, by way of example, a diagram of an embodiment of the system 100 that helps explain beam generating device 102A-102E communication. A beam generating device 102A-102E communicates with other beam generating devices 102A-102E in communication range, that can satisfy a same objective, or a combination thereof. Overlap in circles 440A, 440B, 440C, 440D, 440E indicates beam generating devices 102A-102E in communication range with each other, beam generating devices 102A-102E that can satisfy a same objective, or a combination thereof.

In the example of FIG. 4, the circles 440A and 440E, 440B and 440C, and 440D and 440E each overlap, respectively. In the example of FIG. 4, the beam generating device 102E can generate a message 234 and transmit that message 234 to both the beam generating devices 102A and 102D. The beam generating device 102D can generate a message 234 and provide that message to the beam generating device 102E.

The message sharing (determining which beam generating devices 102 communicate with each other) can be determined before launch of the system 100 or after launch of the system 100. For example, if the beam generating device 102 receives a message 234, the beam generating device 102 can consider that message and the objectives of the corresponding beam generating device 102 in determining an action to be performed.

A beam 442 indicates communication between adjacent systems of beam generating devices 440. A first system includes the beam generating devices 102A, 102D, 102E and a second system includes the beam generating devices 102B, 102C. Even though the first and second systems do not overlap, they can communicate with each other. The communication can help track an object that travels from an area being monitored by the first system to an area being monitored by the second system.

Figure 5:
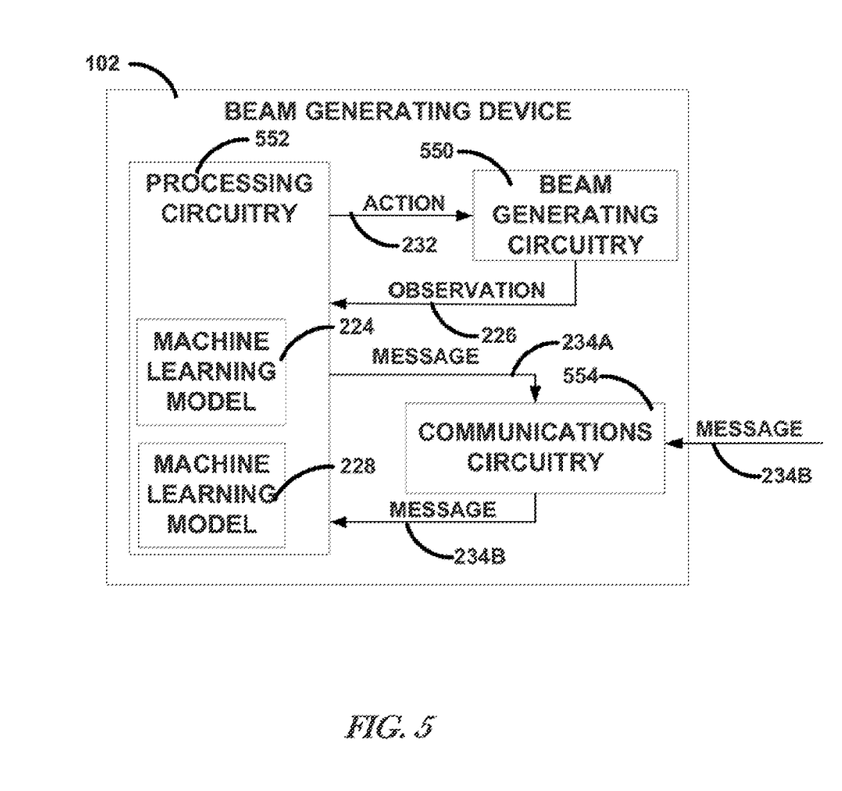
FIG. 5 illustrates, by way of example, an exploded view diagram of the beam generating device.

FIG. 5 illustrates, by way of example, an exploded view diagram of the beam generating device 102. Note that a reference number without a letter suffix represents a component generally and a reference number with a letter suffix represents a specific instance of the component. Thus, the beam generating device 102, for example generally represents all the beam generating devices 102A-102E.

The beam generating device 102 as illustrated includes beam generating circuitry 550, processing circuitry 552, and communications circuitry 554. The beam generating circuitry 550 includes electric or electronic components configured to generate a directed electromagnetic (EM) wave. The electric or electronic components that generate the EM wave can include one or more antennas, amplifiers, modulators, duplexers, oscillators, doppler filters, capacitors, inductors, mixers, phase-locked-loops (PLLs), switches, multiplexers, or the like.

The beam from the beam generating circuitry 554 can be directed at a target. The target can respond to the beam, such as when data is modulated on the beam (e.g., communications) or the beam can reflect off the target back to the beam generating circuitry 550 (e.g., radar). The observation 226 can include the response from the target or data representing the EM reflected off the target and received at the beam generating circuitry 550.

The processing circuitry 552 performs operations that implement the first and second ML models 224, 228. The processing circuitry 552 can receive the message 234B from the communications circuitry 554, the observation 226 from the beam generating circuitry 550, or both. The first ML model 224 can operate on one or more of the message 234B and the observation 226 to determine an action 232 to be performed by the beam generating circuitry 550. The observation 226, in general, is the result of performing an immediately prior action 232.

The second ML model 228 can operate to determine the message 234A based on the observation 226. The message 234A can be provided to the communications circuitry 554.

The communications circuitry 554 can include electric or electronic components configured to provide the message 234A to one or more other beam generating devices. The communications circuitry 554 can include electric or electronic components configured to receive the message 234B from one or more other beam generating devices. The electric or electronic components of the communications circuitry 554 can include a radio, such as a transmit radio, receive radio, transceiver radio, one or more antennas, a combination thereof, or the like.

Figure 6:
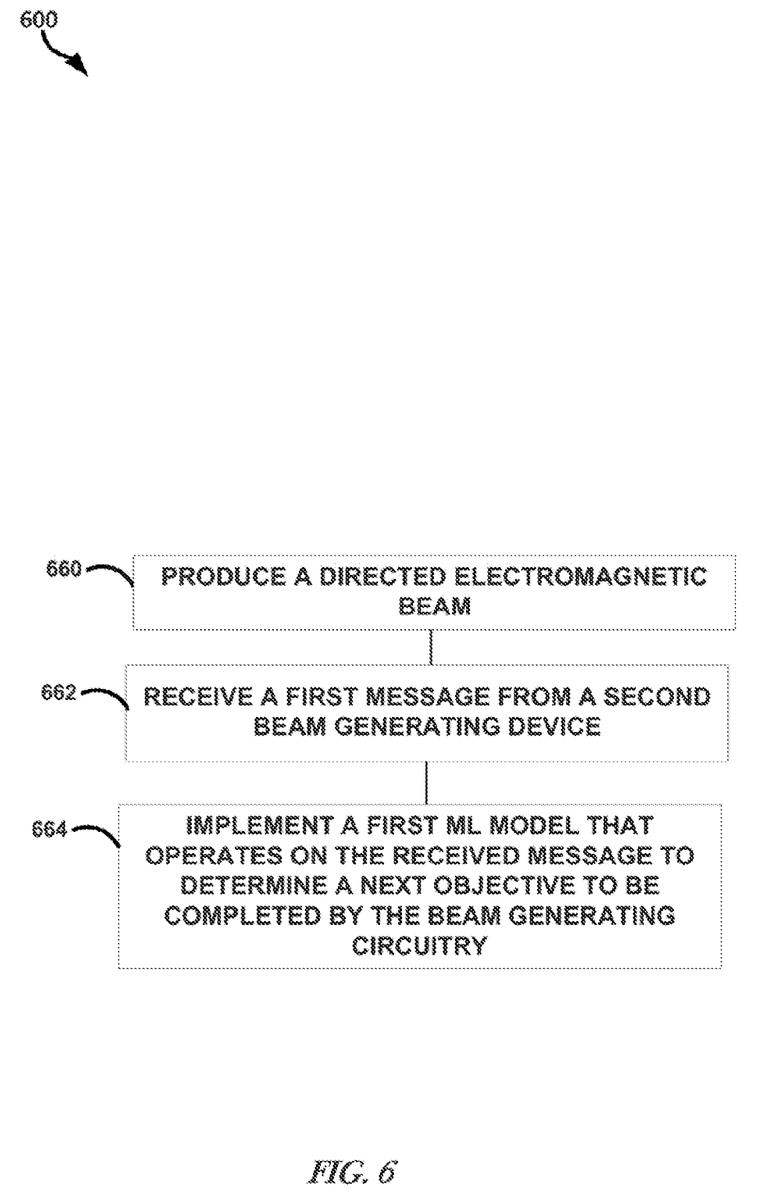
FIG. 6 illustrates, by way of example, a diagram of a method for beam generating device cooperation.

FIG. 6 illustrates, by way of example, a diagram of a method 600 for beam generating device cooperation. The method 600 as illustrated includes producing, by a beam generating device 102, a directed electromagnetic beam, at operation 602; receiving a first message from a second beam generating device, at operation 604; and implementing a first machine learning (ML) model that operates on the received first message to determine a next objective to be completed by the beam generating circuitry, at operation 606.

The method 600 can further include generating an observation that is a result of a directed electromagnetic beam and the first ML model further operates on the observation to determine the next objective to be completed by the beam generating circuitry. The method 600 can further include implementing a second ML model that operates on the observation to generate a second message. The method 600 can further include transmitting the generated second message to the second beam generating device.

The method 600 can further include, wherein the first message indicates a state of an objective after the second beam generating device makes an observation based on a beam generated by beam generation circuitry of the second beam generating device. The method 600 can further include, wherein the first message further indicates the objective associated with the observation. The method 600 can further include, wherein first beam generating device is trained using curricula learning.

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 7:
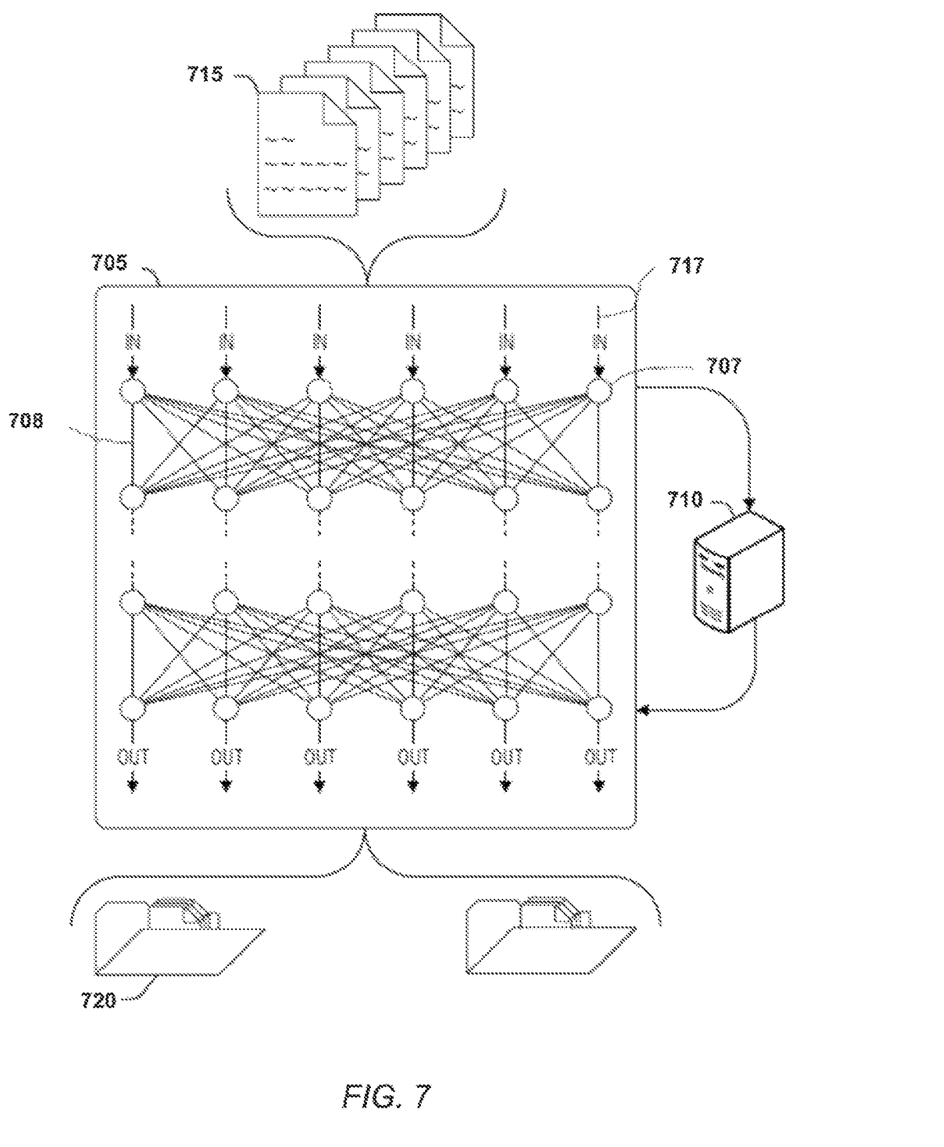
FIG. 7 is a block diagram of an example of an environment including a system for neural network training, according to an embodiment.

FIG. 7 is a block diagram of an example of an environment including a system for neural network training, according to an embodiment. The system includes an artificial NN (ANN) 705 that is trained using a processing node 710. The processing node 710 can include processing circuitry, such as a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 705, or even different nodes 707 within layers. Thus, a set of processing nodes 710 is arranged to perform the training of the ANN 705.

The set of processing nodes 710 is arranged to receive a training set 715 for the ANN 705. The ANN 705 comprises a set of nodes 707 arranged in layers (illustrated as rows of nodes 707) and a set of inter-node weights 708 (e.g., parameters) between nodes in the set of nodes. In an example, the training set 715 is a subset of a complete training set. Here, the subset may enable processing nodes with limited storage resources to participate in training the ANN 705.

The training data may include multiple numerical values representative of a domain, such as azimuth, elevation, range, location, time at which the beam pointing sample was gathered, or the like, from a recent (e.g., most recent beam pointing sampling operation). More recent values (in terms of time) can be considered more certain and are less likely to benefit from resampling. Less recent values (in terms of time) can be more uncertain than more recent values (in terms of time) because the environment around the beam generating devices 102 is more likely to have changed since a last observation. An entire grid of values for a given area can be fed into the ML model 224, 228 (see FIG. 2) to determine where a beam is to be pointed to next to minimize the overall uncertainty of the objectives.

Each value of the training or input 717 to be classified once ANN 705 is trained, is provided to a corresponding node 707 in the first layer or input layer of ANN 705. The values propagate through the layers and are changed by the objective function.

As noted above, the set of processing nodes is arranged to train the neural network to create a trained neural network. Once trained, data input into the ANN will produce valid classifications 720 (e.g., the input data 717 will be assigned into categories), for example. The training performed by the set of processing nodes 707 is iterative. In an example, each iteration of the training the neural network is performed independently between layers of the ANN 705. Thus, two distinct layers may be processed in parallel by different members of the set of processing nodes. In an example, different layers of the ANN 705 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 707 (e.g., neurons) are trained independently. In an example, the nodes are trained on different hardware.

Figure 8:
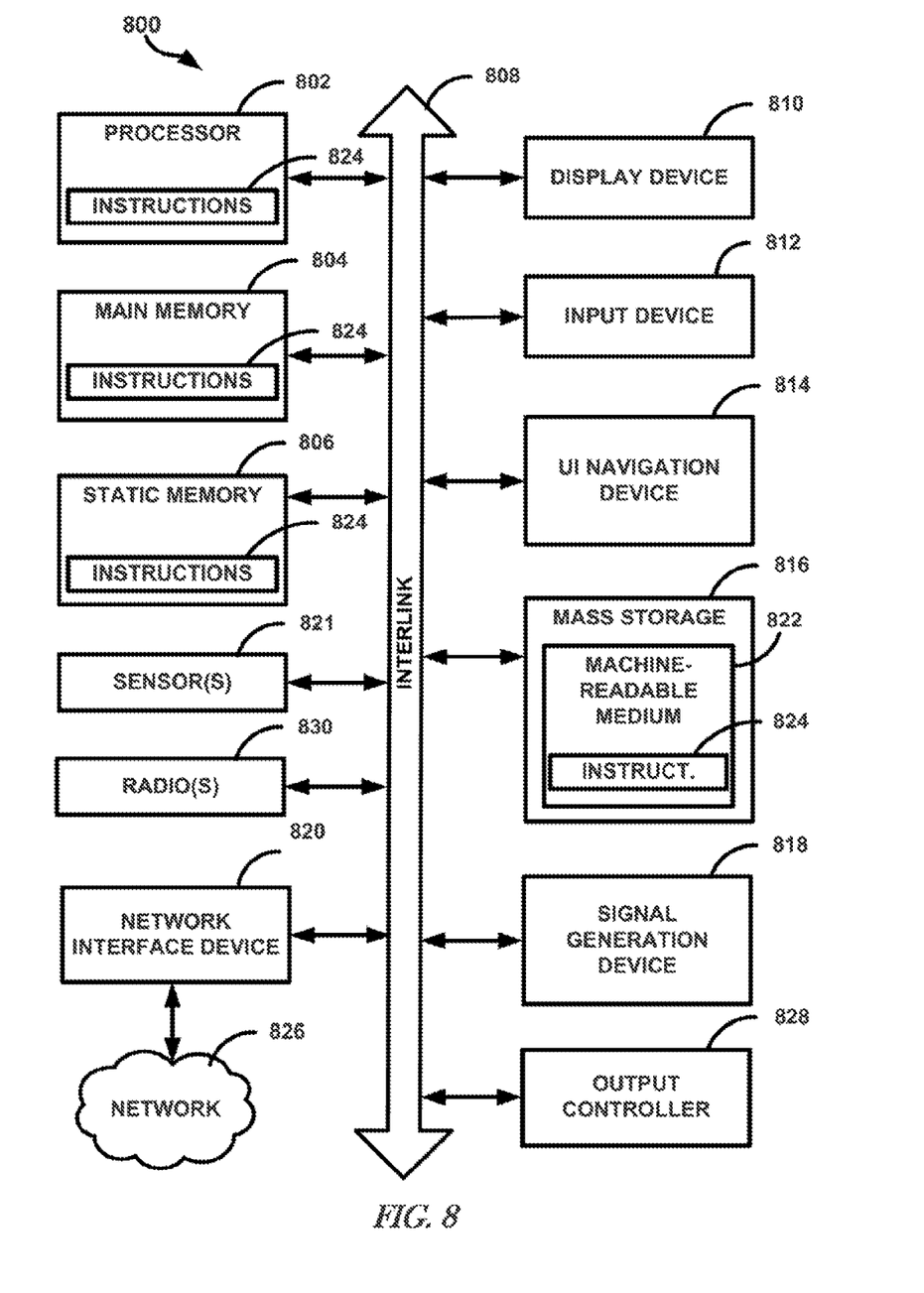
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system within which instructions, for causing the machine to perform any one or more of the methodologies discussed herein, may be executed. One or more of the operations or components of FIGS. 1-7 can include or be implemented using one or more components of the machine 800. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a mass storage unit 816, a signal generation device 818 (e.g., a speaker), a network interface device 820, and a radio 830 such as Bluetooth, WWAN, WLAN, and NFC, permitting the application of security controls on such protocols.

The mass storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., wireless fidelity (WiFi) and WiMax networks). The term "transmission medium" shall be taken to include any intangible medium that is capable of storing, encoding, or carrying instructions for execution by the machine, and includes digital or analog communications signals or other intangible media to facilitate communication of such software.

Teachings provide a method to network beam generating devices, such as radars, satellites, communications devices, or the like, that optimizes track handoff, increases track accuracy, and increases overall system performance and capacity. Multi-agent objective completion can be achieved through a learned communications channel (learned message 234). The cost function of the multi-agent objective can be based on percent correct track hand-offs, joint precision 3D tracking of a relative fraction of the tracks, a background scan rate, a percentage of new targets detected, percent dropped tracks, percent false splits, percent falsely merged tracks, percent track switches, or a combination thereof.

Teachings can provide tracking or communications by establishing a loss function that achieves the multi-objective goal, establishing a differentiable communication object to connect beam generating devices to auto-learn to meet goals and constraints, and simultaneously train beam generating resource management and communication object using curricula learning where each curricula step adds complexity of additional beam generating devices and objectives.

ADDITIONAL NOTES AND EXAMPLES

Example 1 can include first beam generating device comprising beam generating circuitry configured to produce a directed electromagnetic beam, communications circuitry configured to receive a first message from a second beam generating device, and processing circuitry configured to implement a first machine learning (ML) model that operates on the received first message to determine a next objective to be completed by the beam generating circuitry.

In Example 2, Example 1 can further include, wherein the beam generating circuitry generates an observation that is a result of a directed electromagnetic beam and the first ML model further operates on the observation to determine the next objective to be completed by the beam generating circuitry.

In Example 3, Example 2 can further include, wherein the processing circuitry is further configured to implement a second ML model that operates on the observation to generate a second message, and the communications circuitry is further configured to transmit the generated second message to the second beam generating device.

In Example 4, at least one of Examples 1-3 can further include, wherein the first message indicates a state of an objective after the second beam generating device makes an observation based on a beam generated by beam generation circuitry of the second beam generating device.

In Example 5, Example 4 can further include, wherein the first message further indicates the objective associated with the observation.

In Example 6, at least one of Examples 1-5 can further include, wherein first beam generating device is trained using curricula learning.

In Example 7, at least one of Examples 1-6 can further include, wherein the first beam generating device is a radar device or a wireless fidelity communications device.

Example 8 can include a non-transitory machine-readable medium including instructions that, when executed by a machine, cause the machine to perform operations for beam generating device management, the operations comprising producing a directed electromagnetic beam, receiving a first message from a second beam generating device, and implementing a first machine learning (ML) model that operates on the received first message to determine a next objective to be completed by the beam generating circuitry.

In Example 9, Example 8 can further include, wherein the operations further comprise generating an observation that is a result of a directed electromagnetic beam and the first ML model further operates on the observation to determine the next objective to be completed by the beam generating circuitry.

In Example 10, Example 9 can further include, wherein the operations further comprise implementing a second ML model that operates on the observation to generate a second message, and transmitting the generated second message to the second beam generating device.

In Example 11, at least one of Examples 8-10 can further include, wherein the first message indicates a state of an objective after the second beam generating device makes an observation based on a beam generated by beam generation circuitry of the second beam generating device.

In Example 12, Example 11 can further include, wherein the first message further indicates the objective associated with the observation.

In Example 13, at least one of Examples 8-12 can further include, wherein first beam generating device is trained using curricula learning.

In Example 14, at least one of Examples 8-13 can further include, wherein the first beam generating device is a radar device or a wireless fidelity communications device.

Example 15 can include a method for beam generating device management comprising producing a directed electromagnetic beam, receiving a first message from a second beam generating device, and implementing a first machine learning (ML) model that operates on the received first message to determine a next objective to be completed by the beam generating circuitry.

In Example 16, Example 15 can further include generating an observation that is a result of a directed electromagnetic beam and the first ML model further operates on the observation to determine the next objective to be completed by the beam generating circuitry.

In Example 17, Example 16 can further include implementing a second ML model that operates on the observation to generate a second message, and transmitting the generated second message to the second beam generating device.

In Example 18, at least one of Examples 15-17 can further include, wherein the first message indicates a state of an objective after the second beam generating device makes an observation based on a beam generated by beam generation circuitry of the second beam generating device.

In Example 19, Example 18 can further include, wherein the first message further indicates the objective associated with the observation.

In Example 20, at least one of Examples 15-19 can further include, wherein first beam generating device is trained using curricula learning.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:
1. A first beam generating device comprising:
first beam generating circuitry configured to produce a directed electromagnetic beam;
communications circuitry configured to receive a first message from a second beam generating device, the second beam generating device working together with the first beam generating device to satisfy an objective and the first message indicating a state of the objective after the second beam generating device makes a first observation based on a beam generated by second beam generation circuitry of the second beam generating device; and processing circuitry configured to:

implement a first machine learning (ML) model that operates on the received first message to determine a next operation to be completed by the first beam generating circuitry in satisfying the objective.

2. The first beam generating device of claim 1, wherein the beam generating circuitry generates a second observation that is a result of the directed electromagnetic beam and the first ML model further operates on the second observation to determine the next objective to be completed by the first beam generating circuitry.

3. The first beam generating device of claim 2, wherein:

the processing circuitry is further configured to implement a second ML model that operates on the second observation to generate a second message; and the communications circuitry is further configured to transmit the generated second message to the second beam generating device.

4. The first beam generating device of claim 1, wherein the first message further indicates the objective associated with the first observation.

5. The first beam generating device of claim 1, wherein first beam generating device is trained using curricula learning.

6. The first beam generating device of claim 1, wherein the first beam generating device is a radar device or a wireless fidelity communications device.

7. A non-transitory machine-readable medium including instructions that, when executed by a machine, cause the machine to perform operations for beam generating device management, the operations comprising:

producing, by first beam generating circuitry of a first beam generating device, a directed electromagnetic beam;

receiving a first message from a second beam generating device, the second beam generating device working together with the first beam generating device to satisfy an objective and the first message indicating a state of the objective after the second beam generating device makes a first observation based on a beam generated by second beam generation circuitry of the second beam generating device; and implementing a first machine learning (ML) model that operates on the received first message to determine a next operation to be completed by the first beam generating circuitry in satisfying the objective.

8. The non-transitory machine-readable medium of claim 7, wherein the operations further comprise generating a second observation that is a result of the directed electromagnetic beam and the first ML model further operates on the second observation to determine the next objective to be completed by the first beam generating circuitry.

9. The non-transitory machine-readable medium of claim 8, wherein the operations further comprise:

implementing a second ML model that operates on the first observation to generate a second message; and transmitting the generated second message to the second beam generating device.

10. The non-transitory machine-readable medium of claim 7, wherein the first message further indicates the objective associated with the first observation.

11. The non-transitory machine-readable medium of claim 7, wherein first beam generating device is trained using curricula learning.

12. The non-transitory machine-readable medium of claim 7, wherein the first beam generating device is a radar device or a wireless fidelity communications device.

13. A method for beam generating device management comprising:

producing, by beam generating circuitry of a first beam generating device working together with other beam generating devices to satisfy an objective, a directed electromagnetic beam;

receiving a first message from a second beam generating device of the beam generating devices, the second beam generating device working together with the first beam generating device to satisfy an objective and the first message indicating a state of the objective after the second beam generating device makes a first observation based on a beam generated by second beam generation circuitry of the second beam generating device; and implementing a first machine learning (ML) model that operates on the received first message to determine a next operation to be completed by the first beam generating circuitry in satisfying the objective.

14. The method of claim 13, further comprising generating a second observation that is a result of the directed electromagnetic beam and the first ML model further operates on the second observation to determine the next objective to be completed by the first beam generating circuitry.

15. The method of claim 14, further comprising:

implementing a second ML model that operates on the second observation to generate a second message; and transmitting the generated second message to the second beam generating device.

16. The method of claim 13, wherein the first message further indicates the objective associated with the first observation.

17. The method of claim 13, wherein first beam generating device is trained using curricula learning.

* * * * *